(12) United States Patent
Wannke et al.

(10) Patent No.: US 6,465,935 B1
(45) Date of Patent: Oct. 15, 2002

(54) ULTRASONIC TRANSDUCER

(75) Inventors: Dietmar Wannke, Reutlingen; Dieter Karr, Tiefenbronn; Meike Fehse, Leonberg; Martin Noll, Nuggensturm; Peter Rapps, Karlsruhe; Waldemar Ernst, Vaihingen/Enz; Dirk Schmid, Renningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/462,003

(22) PCT Filed: Jun. 25, 1998

(86) PCT No.: PCT/DE98/01734

§ 371 (c)(1), (2), (4) Date: Dec. 29, 1999

(87) PCT Pub. No.: WO99/01234

PCT Pub. Date: Jan. 14, 1999

(30) Foreign Application Priority Data

Jun. 30, 1997 (DE) .......................... 197 27 877

(51) Int. Cl.[7] .............................................. H01L 41/04
(52) U.S. Cl. .......................................................... 310/324
(58) Field of Search .................................. 310/324, 330

(56) References Cited

U.S. PATENT DOCUMENTS

| | | | |
|---|---|---|---|
| 3,638,052 A | 1/1972 | Massa | 310/324 |
| 3,890,423 A * | 6/1975 | Zacharias, Jr. | 310/335 |
| 3,943,388 A | 3/1976 | Massa | 310/324 |
| 4,437,032 A * | 3/1984 | Gelhard | 310/324 |
| 4,607,186 A | 8/1986 | Takayama et al. | 310/324 |
| 4,823,042 A | 4/1989 | Coffey et al. | 310/324 |
| 4,907,207 A * | 3/1990 | Moeckl | 367/140 |
| 4,957,100 A * | 9/1990 | Herzog et al. | 601/2 |
| 5,446,332 A * | 8/1995 | Rapps et al. | 310/324 |
| 6,047,603 A * | 4/2000 | Ohtera et al. | 73/649 |
| 6,104,121 A * | 8/2000 | Thurn | 310/321 |
| 6,107,722 A * | 8/2000 | Thurn | 310/322 |

FOREIGN PATENT DOCUMENTS

| | | |
|---|---|---|
| DE | 351 626 | 4/1922 |
| DE | 33 24 575 A | 2/1984 |
| DE | 34 41 684 | 5/1986 |
| EP | 0 075 302 | 3/1983 |
| EP | 0 678 853 | 10/1995 |

* cited by examiner

Primary Examiner—Nestor Ramirez
Assistant Examiner—Peter Medley
(74) Attorney, Agent, or Firm—Kenyon & Kenyon

(57) ABSTRACT

An ultrasonic transducer having a pot-like casing has an outer bottom face which is designed in part as a vibrating diaphragm. A stabilizing ring is arranged on the outside of the wall of the pot-like casing, imparting a greater rigidity to the casing and limiting the ultrasonic vibration essentially to the bottom of the pot as a vibrating diaphragm. The propagation and reception beams of the ultrasonic waves can be shaped further by an additional arrangement of a sound directing device in the area of the vibrating diaphragm.

10 Claims, 3 Drawing Sheets

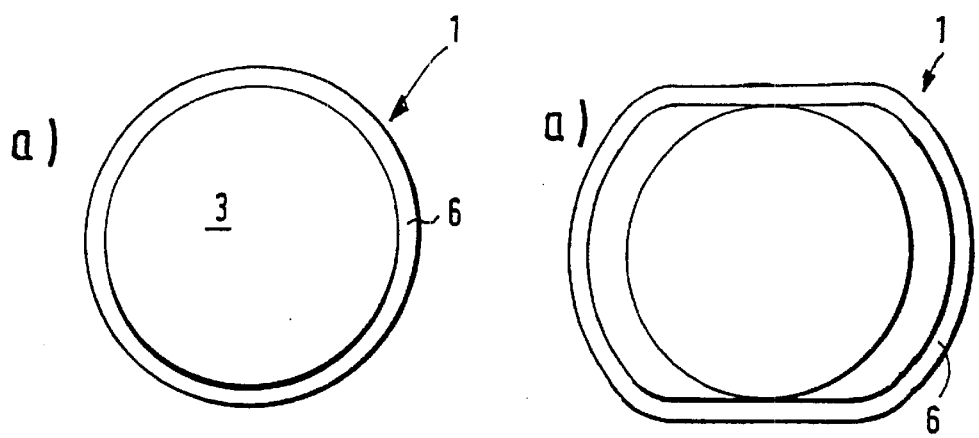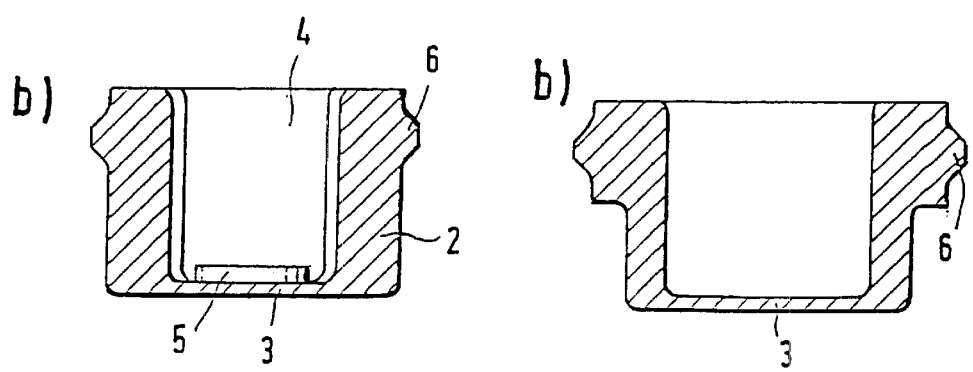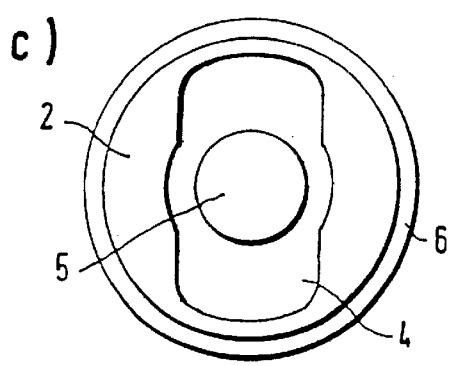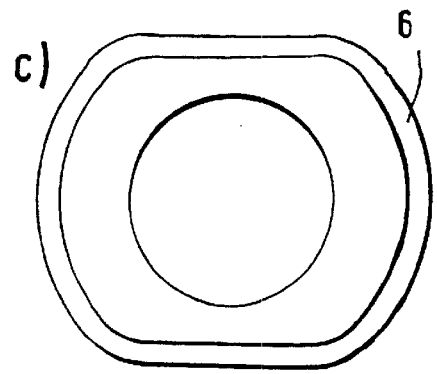
FIG. 1      FIG. 2

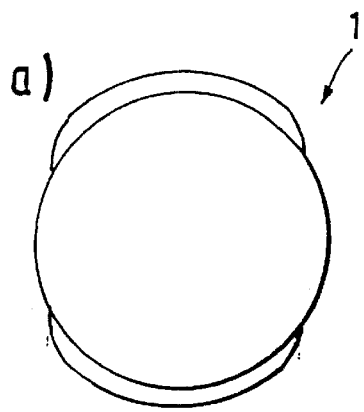
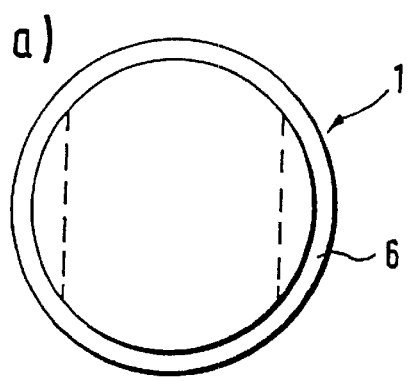
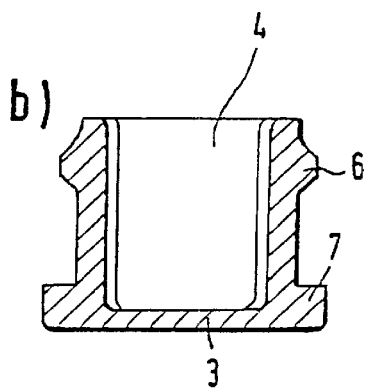
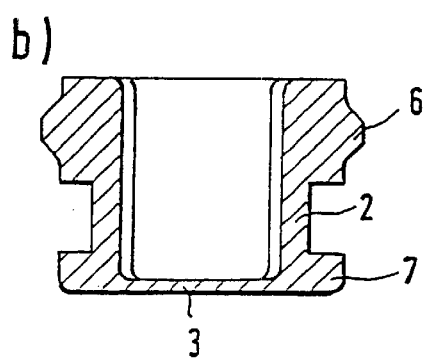
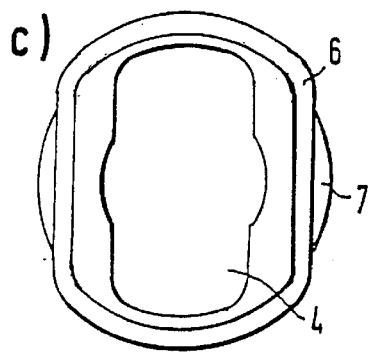
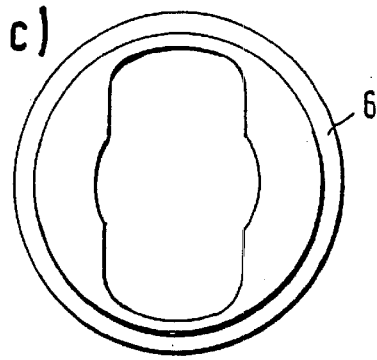
FIG. 3　　　　　　　　FIG. 4

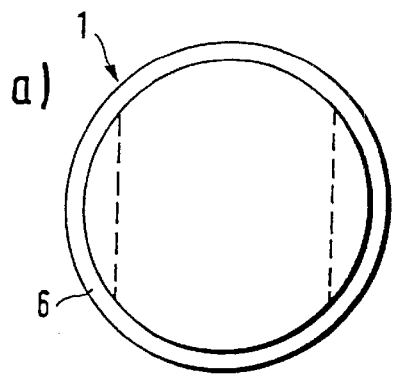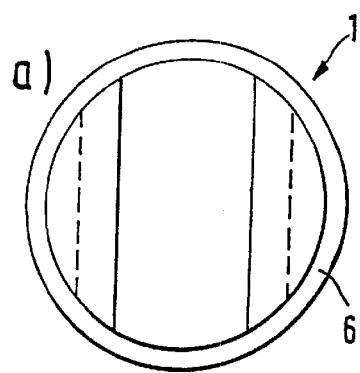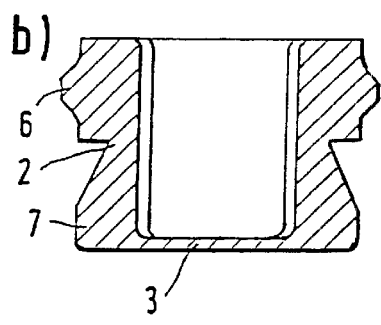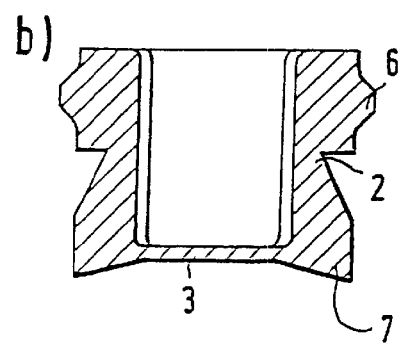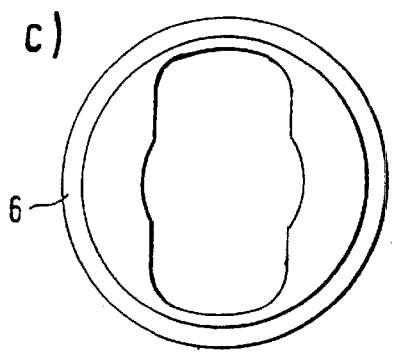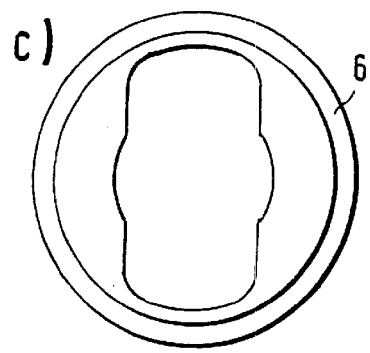
FIG. 5   FIG. 6

ULTRASONIC TRANSDUCER

FIELD OF THE INVENTION

The present invention relates to an ultrasonic transducer having a pot-like casing.

BACKGROUND INFORMATION

European Patent Application No. 0 075 302 describes an ultrasonic transducer having a pot-shaped casing. On the inside, a piezoceramic vibrating element is mounted on the bottom of the pot. To dampen harmonics and shape the propagation and reception beams of this arrangement, arc-shaped damping elements are mounted on two opposing sides on the inside of the pot-shaped transducer casing. For mounting, the ultrasonic transducer is inserted into a casing made of soft plastic or soft rubber. One disadvantage of this design is that not only the diaphragm but also the casing wall. are excited to vibration due to the uniform wall thickness of the pot-shaped casing, which thus has a negative effect on both the transmission and reception beams or may even suppress them due to superimposed harmonics.

SUMMARY OF THE INVENTION

The ultrasonic transducer according to the present invention has the advantage that a greater rigidity of the casing is achieved due to the stabilizing ring on the wall of the pot-like casing, so the remaining part of the bottom area of the casing functions as a vibrating diaphragm, preferably vibrating at the fundamental wave. It is advantageous that the post-pulse oscillation time of the vibrating diaphragm is shortened because of the greater mass of the wall, advantageously yielding better propagation and reception beams on the whole as well as better vibration characteristics. In particular, a distance measurement, e.g., in a parking aid for a motor vehicle, can still be performed even at very small distances from an obstacle due to the shortened post-pulse oscillation time.

It is also advantageous that due to the remote arrangement of the stabilizing ring from the wall of the vibrating diaphragm, the sensor head can be reduced to minimal installation dimensions, so that after installation in a bumper, for example, an optimum appearance is achieved without any disturbing effect.

The stabilizing ring is formed at the time of manufacture of the casing, so the manufacturing costs are relatively low.

To shape the propagation beam in an advantageous manner, a sound directing device is arranged on the outside of the wall in the area of the vibrating diaphragm. Depending on the intended purpose, the sound directing device may be designed in such a way as to obtain the broadest propagation beam in the horizontal direction and the narrowest possible propagation beam in the vertical direction. The sound directing device is designed as a ring and includes the vibrating diaphragm. In addition, with an appropriate design of the sound directing device, it is also advantageous for the range of the ultrasonic transducer to be selectable.

To give an unobtrusive appearance, the sound directing device is preferably designed to be flush with the plane of the vibrating diaphragm. In an alternative embodiment, the sound directing can also be designed in a conical shape to have an even greater influence on the propagation and reception beams of the ultrasonic waves. To create better installation conditions, the cross section of the sound directing device is either rectangular or conical in shape.

BRIEF DESCRIPTION OF THE DRAWINGS

FIG. 1a shows a top view of a first embodiment of an ultrasonic transducer according to the present invention.

FIG. 1b shows a cross-sectional view of the ultrasonic transducer shown in FIG. 1a.

FIG. 1c shows a rear top view of the ultrasonic transducer shown in FIG. 1a.

FIG. 2a shows a top view of a second embodiment of an ultrasonic transducer according to the present invention.

FIG. 2b shows a cross-sectional view of the ultrasonic transducer shown in FIG. 2a.

FIG. 2c shows a rear top view of the ultrasonic transducer shown in FIG. 2a.

FIG. 3a shows a top view of a third embodiment of an ultrasonic transducer according to the present invention.

FIG. 3b shows a cross-sectional view of the ultrasonic transducer shown in FIG. 3a.

FIG. 3c shows a rear top view of the ultrasonic transducer shown in FIG. 3a.

FIG. 4a shows a top view of a fourth embodiment of an ultrasonic transducer according to the present invention.

FIG. 4b shows a cross-sectional view of the ultrasonic transducer shown in FIG. 4a.

FIG. 4c shows a rear top view of the ultrasonic transducer shown in FIG. 4a.

FIG. 5a shows a top view of a fifth embodiment of an ultrasonic transducer according to the present invention.

FIG. 5b shows a cross-sectional view of the ultrasonic transducer shown in FIG. 5a.

FIG. 5c shows a rear top view of the ultrasonic transducer shown in FIG. 5a.

FIG. 6a shows a top view of a sixth embodiment of an ultrasonic transducer according to the present invention.

FIG. 6b shows a cross-sectional view of the ultrasonic transducer shown in FIG. 6a.

FIG. 6c shows a rear top view of the ultrasonic transducer shown in FIG. 6a.

DETAILED DESCRIPTION

FIG. 1a shows a top view of a first embodiment of an ultrasonic transducer 1.

The bottom of the pot, designed as vibrating diaphragm 3, can be seen. A stabilizing ring 6 is arranged in a ring pattern on the outside wall. FIG. 1b shows a sectional diagram illustrating ultrasonic transducer 1 in cross section, showing a pot-like casing having a relatively thick wall 2, vibrating diaphragm 3 as the bottom of the pot and stabilizing ring 6. A vibrating element 5 is applied to the bottom of the pot on the inside, preferably by bonding, so that it has good mechanical contact with vibrating diaphragm 3. The interior space of the casing is referred to as recess 4. FIG. 1c shows a rear top view looking into the casing. Recess 4 has an approximately rectangular cross-sectional area which also borders vibrating diaphragm 3. For the sake of thoroughness, it should be pointed out that electric leads to vibrating element 5 have been omitted to simplify the diagram.

In the embodiments described below, the same reference notation is used as that provided for similar parts in the first embodiment. Only the essential deviations are explained in greater detail, because the design in the following embodiments is substantially similar to that in the first embodiment. However, the forms of presentation are comparable to those in the first embodiment.

In the second embodiment shown in FIG. 2a, the stabilizing ring on the outside of the wall is not designed with circular symmetry, but instead it has a thickened wall on two opposite sides, while the wall is flattened on the sides that are offset by 90°. With this design, the propagation and reception beams of the ultrasonic waves are also shaped in addition to the stiffening of the wall. It can be seen in FIGS. 2b and 2c that in contrast with the first embodiment, the recess is designed to be cylindrical.

In the third embodiment shown in FIGS. 3a–3c, stabilizing ring 6 is designed to be approximately oval and approximately parallel to the cross-sectional area of recess 4. Wall 2 is thus approximately rectangular in shape in the rear part, but it is circular in the area of vibrating diaphragm 3. The circular structure forms a sound directing device 7 which limits the sound waves. Sound directing device 7 is designed to be flush with the outside surface vibrating diaphragm 3 and has a rectangular cross section. The dimensions of the individual elements depend on the operating frequency as well as the available installation dimensions, e.g., in the bumper of a motor vehicle. The individual dimensions are expediently determined by comparative experiments.

The embodiments shown in FIG. 4a through FIG. 6c are derived from the embodiment according to FIG. 3. The fourth embodiment corresponds substantially to the third embodiment. Recess 4 is approximately rectangular or oval. However, the stabilizing ring is designed with rotational symmetry and is much thicker than in the third embodiment (see FIG. 4b). Asymmetrical exterior sound directing devices are formed by the connection of the oval pot and rotationally symmetrical vibrating diaphragm 3.

These asymmetrical sound directing devices cause the exterior sound directing devices to resonate in phase opposition in relation to the diaphragm. Resonating in phase opposition causes the sound directing function to be amplified advantageously.

The fifth embodiment shown in FIGS. 5a–5c differs from the fourth embodiment essentially by the constriction of wall 2. Sound directing device 7 is designed to be conical on the rear side. This yields a partial acoustic decoupling of the rear area of the pot from the vibrating diaphragm.

In addition, in the sixth embodiment shown in FIGS. 6a–6c, sound directing device 7 is designed with a conical shape on the outer base area, so it forms a small funnel in combination with vibrating diaphragm 3. Therefore, the propagation and reception beams can be shaped to an even greater extent. In addition, with the embodiments shown in FIG. 2a through FIG. 6c, the dimensions of the unintentionally resonating material are reduced due to the constriction of wall 2, thereby reducing the die-down time (post-pulse oscillation time) of the ultrasonic transducer after the energizing pulse has stopped. As a result, the smallest measurable distance is smaller in comparison with known ultrasonic sensors, so this sensor according to the present invention is especially suitable for installation in a parking aid, because tight space situations can be detected advantageously with it.

What is claimed is:

1. An ultrasonic transducer, comprising:
    a pot-shaped casing which includes a ring-shaped wall and a bottom section, the ring-shaped wall having varying wall thicknesses, the bottom section including an outer portion and an inner portion, the outer portion having a part which acts as a vibrating diaphragm;
    a piezoelectric vibrating element mounted on the inner portion of the bottom section; and
    a stabilizing ring situated on an external portion of the ring-shaped wall, the stabilizing ring extending above a remaining portion of the ring-shaped wall, wherein the stabilizing ring and the ring-shaped wall induce an improved vibration response of the vibrating diaphragm as compared to an ultrasonic transducer having a wall of essentially uniform thickness.

2. The ultrasonic transducer according to claim 1, wherein the stabilizing ring is situated on the ring-shaped wall and at a predetermined distance from the vibrating diaphragm.

3. The ultrasonic transducer according to claim 1, wherein the stabilizing ring and the pot-shaped casing are composed of a same material.

4. The ultrasonic transducer according to claim 1, further comprising:
    a sound directing device situated on the external portion of the ring-shaped wall and substantially near the vibrating diaphragm.

5. The ultrasonic transducer according to claim 4, wherein the sound directing device includes a ring which surrounds the vibrating diaphragm.

6. The ultrasonic transducer according to claim 4, wherein the sound directing device has an end portion which is coupled to the vibrating diaphragm in a flush manner.

7. The ultrasonic transducer according to claim 4, wherein the sound directing device and the vibrating diaphragm form a funnel.

8. The ultrasonic transducer according to claim 4, wherein the sound directing device has a conical shape with respect to the ring-shaped wall, and wherein the ring-shaped wall has a constriction.

9. The ultrasonic transducer according to claim 4, further comprising:
    a recess having one of an approximately rectangular cross section and an approximately oval cross section.

10. The ultrasonic transducer according to claim 9, wherein the recess has a cylindrical shape, and wherein the ring-shaped wall is flattened at two opposite locations on an external surface of the ring-shaped wall.

* * * * *